United States Patent
Bernstein et al.

(10) Patent No.: US 8,725,717 B2
(45) Date of Patent: May 13, 2014

(54) SYSTEM AND METHOD FOR IDENTIFYING TOPICS FOR SHORT TEXT COMMUNICATIONS

(75) Inventors: Michael Bernstein, Cambridge, MA (US); Lichan Hong, Mountain View, CA (US); Ed H. Chi, Palo Alto, CA (US); Bongwon Suh, Cupertino, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 364 days.

(21) Appl. No.: 12/646,810

(22) Filed: Dec. 23, 2009

(65) Prior Publication Data

US 2011/0153595 A1 Jun. 23, 2011

(51) Int. Cl.
*G06F 17/30* (2006.01)
*G06F 17/27* (2006.01)

(52) U.S. Cl.
CPC .... *G06F 17/30864* (2013.01); *G06F 17/30867* (2013.01); *G06F 17/2785* (2013.01)
USPC .......................................... 707/708; 707/771

(58) Field of Classification Search
None
See application file for complete search history.

(56) References Cited

U.S. PATENT DOCUMENTS

| | | | |
|---|---|---|---|
| 7,519,589 B2 * | 4/2009 | Charnock et al. ..................... 1/1 |
| 8,375,024 B2 | 2/2013 | Goeldi | |
| 8,386,509 B1 * | 2/2013 | Scofield et al. ............... 707/769 |
| 2002/0062368 A1 * | 5/2002 | Holtzman et al. ............ 709/224 |
| 2003/0078913 A1 * | 4/2003 | McGreevy ........................ 707/3 |
| 2004/0243554 A1 * | 12/2004 | Broder et al. ...................... 707/3 |
| 2005/0022114 A1 * | 1/2005 | Shanahan et al. ............. 715/513 |
| 2005/0080613 A1 * | 4/2005 | Colledge et al. .................. 704/9 |
| 2005/0080856 A1 * | 4/2005 | Kirsch .......................... 709/206 |
| 2005/0114781 A1 | 5/2005 | Brownholtz et al. |
| 2005/0125216 A1 * | 6/2005 | Chitrapura et al. ............... 704/1 |
| 2006/0026152 A1 * | 2/2006 | Zeng et al. ........................ 707/5 |
| 2006/0069589 A1 * | 3/2006 | Nigam et al. ..................... 705/1 |
| 2006/0271526 A1 * | 11/2006 | Charnock et al. ................. 707/3 |
| 2007/0027932 A1 | 2/2007 | Thibeault |
| 2007/0073745 A1 * | 3/2007 | Scott et al. .................... 707/100 |
| 2007/0083468 A1 | 4/2007 | Wetherell |
| 2007/0094247 A1 | 4/2007 | Chowdhury |
| 2007/0198459 A1 | 8/2007 | Boone et al. |

(Continued)

FOREIGN PATENT DOCUMENTS

| | | |
|---|---|---|
| EP | 2073131 | 6/2009 |
| GB | 2417109 | 2/2006 |

OTHER PUBLICATIONS

Paige H. Adams and Craig H. Martell "Topic Detection and Extraction in Chat", 2008 IEEE International Conference.*

(Continued)

*Primary Examiner* — Polina Peach
(74) *Attorney, Agent, or Firm* — Patrick J.S. Inouye; Krista A. Wittman; Leonid Kisselev (57) ABSTRACT

A system and method for identifying topics for short text communications is provided. Tokens are extracted from a short text communication. A query is generated using the extracted tokens. The query is applied to a set of documents. Those documents in the set that match the query are identified as search results. Salient terms associated with each of the search results are identified. A threshold is applied to the identified salient terms. The salient terms that satisfy the threshold are selected as topics for the short text communication.

16 Claims, 4 Drawing Sheets

(56) References Cited

U.S. PATENT DOCUMENTS

| | | | | |
|---|---|---|---|---|
| 2008/0133488 | A1* | 6/2008 | Bandaru et al. | 707/3 |
| 2008/0243842 | A1* | 10/2008 | Liang et al. | 707/6 |
| 2008/0281915 | A1* | 11/2008 | Elad et al. | 709/204 |
| 2009/0150514 | A1* | 6/2009 | Davis et al. | 709/217 |
| 2009/0222551 | A1* | 9/2009 | Neely et al. | 709/224 |
| 2010/0088314 | A1* | 4/2010 | Kuang | 707/733 |
| 2010/0235235 | A1 | 9/2010 | Hosseini et al. | |

OTHER PUBLICATIONS

Bendersky, M. and Crott, W. B. 2008. "Discovering Key Concepts in Verbose Queries." In Proceedings of the 31st Annual international ACM SIGIR Conference on Research and Development in information Retrieval (Singapore, Jul. 20-24, 2008). SIGIR '08. ACM, New York, NY, 491-498.

Phan et al., "Learning to Classify Short and Sparse Text & Web with Hidden Topics from Large-scale Data Collections," Proceedings of the 17th International Conference on the World Wide Web, pp. 91-100, Beijing, China (Apr. 21-25, 2008).

Sahami et al., "A Web-Based Kernel Function for Measuring the Similarity of Short Text Snippets," In Proceedings of the 15th International Conference of World Wide Web (Edinburgh, Scotland, May 23-26, 2006).

Baumer et al., "Smarter Blogroll: An Exploration of Social Topic Extraction for Manageable Blogrolls," Proceedings of the 41st Hawaii International Conference on System Sciences (2008).

M. A. Hearst, "UIs for Faceted Navigation: Recent Advances and Remaining Open Problems," Proc. 2008 Workshop on Human-Computer Interaction and Information Retrieval (2008).

Hearst et al., "What Should Blog Search Look Like?" Proc. 2008 ACM Workshop on Search in Social Media, pp. 95-98 (2008).

Neustaedter et al., "Beyond "From" and "Received": Exploring the Dynamic of Email Triage," Proc. CHI '05, pp. 1977-1980 (2005).

Whittaker et al., "Email Overload: Exploring Personal Information Management of Email," Proc. CHI '96, pp. 276-283 (1996).

Xu et al., "Query Expansion using Local and Global Document Analysis," Poc. SIGIR '96, pp. 4-11 (1996).

F. Oliveira, "Stop Using Your RRS Reader," http://helloform.com/blog/2009/01/stop-using-your-rss-reader (Jan. 13, 2009).

A. Mukherjee, "8 Useful Tips to Manage and Avoid RSS Overload," http://www.dumblittleman.com/2008/06/8-6ways_to_filter_your_rss_feeds.php (May 29, 2008).

J. Catone, "6 Ways to Filter Your RSS Feeds," http://www.readwriteweb.com/archives/6_ways_to_filter_your_rss_feeds.php (Mar. 4, 2008).

S. Whittaker, "Supporting Collaborative Task Management in E-mail," Human-Computer interaction, vol. 20, pp. 49-88 (2005).

Yee et al., "Faceted Metadata for Image Search and Browsing," Proc. CHI '03, pp. 401-408 (2003).

M. Dörk, et al., in VisGets: Coordinated Visualizations for Web-based Information Exploration and Discover, IEEE Trans. on Visualization and Computer Graphics (vol. 14, No. 6, 1205-1212, 2008).

* cited by examiner

SYSTEM AND METHOD FOR IDENTIFYING TOPICS FOR SHORT TEXT COMMUNICATIONS

FIELD

This application relates in general to generating topics for documents, and in particular, to a system and method for identifying topics for short text communications.

BACKGROUND

Communication through short text updates has greatly increased due to the rise in popularity of social networking, which allows users to interact through online communities. Short text updates used in social networking, such as "posts" or "tweets," differs from standard documents, including papers, publications, and reports. For example, short text updates are generally limited to a particular size measured by characters or words. Additionally, the short text updates are usually unstructured text that includes shortcuts, such as abbreviations and acronyms, to comply with the size restrictions.

Generally, each user has a social networking profile that includes a live stream of short text updates posted by and to the user. The short text updates received in a stream can rapidly accumulate such that identifying interesting and important updates becomes difficult. Currently, users have little control over the short text updates that they are able to view. Many users often resort to temporal sampling, which includes viewing the short text updates that are displayed at a particular time during which the user is logged in. However, the sampling process is unreliable and often times, important updates are missed.

Filtering of the short text updates by topic can assist in reducing the number of updates a user must review. However, due to the differences in short text updates and larger documents, conventional methods for identifying topics for a short text update are inadequate. For example, traditional techniques for identifying topics include word repetition detection and co-occurrence matrices, such as Latent Semantic Analysis. Word repetition detection techniques, such as term frequency-inverse document frequency ("tf-idf") generally assume that the frequency or popularity of a term models the importance of that term. For example, the importance of a term increases the more times the term is identified in a document. However, in short text updates, terms are usually not repeated to conserve space and the topic of the short text update may not be included at all in the text. Further, the traditional techniques require large numbers of documents to find statistical patterns, which makes identifying topics for a single short text update or document impractical.

Analyses of short text updates have been performed, such as determining a similarity of short text snippets by Sahami and Heilman, "A Web-Based Kernel Function for Measuring the Similarity of Short Text Snippets," In Proceedings of the 15th International Conference of World Wide Web (Edinburgh, Scotland, May 23-26, 2006). The text of each short text snippet forms a query provided to a search engine for identifying documents. A context vector is generated for the short text snippet using terms from the identified documents. The similarity of two or more short text snippets is determined by comparing the context vectors for each of the short text snippets. However, identifying topics for the short text snippets via a majority voting process is not provided.

Thus, a system and method for accurately identifying topics for one or more short text communications are needed.

SUMMARY

Topics are identified for short text communications via a threshold, which is applied to documents related to the short text communications. Tokens, such as noun phrases are identified and extracted from the short text communication to generate a query. The query is applied to a set of documents to identify the related documents. Once identified, salient terms are determined for each of the related documents and a threshold is applied to identify one or more salient terms as topics for the short text communication.

An embodiment provides a system and method for identifying topics for short text communications. Tokens are extracted from a short text communication. A query is generated using the extracted tokens. The query is applied to a set of documents. Those documents in the set that match the query are identified as search results. Salient terms associated with each of the search results are identified. A threshold is applied to the identified salient terms. The salient terms that satisfy the threshold are selected as topics for the short text communication.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

With the increased use of social networking Websites, communication through streams of short messages, such as short text communications, can quickly become unmanageable. Users are usually unable to view all the short text communications received due to a constant incoming stream of new communication. Identifying a particular short text communication can be difficult based on the minimal amount of content in each message. Conventional methods for identifying topics, such as word repetition detection, are unreliable and often inaccurate for short text communications since the topic may not be included as a token in the text. As well, conventional methods generally require a large amount of communications or documents to identify the topics.

Figure 1:
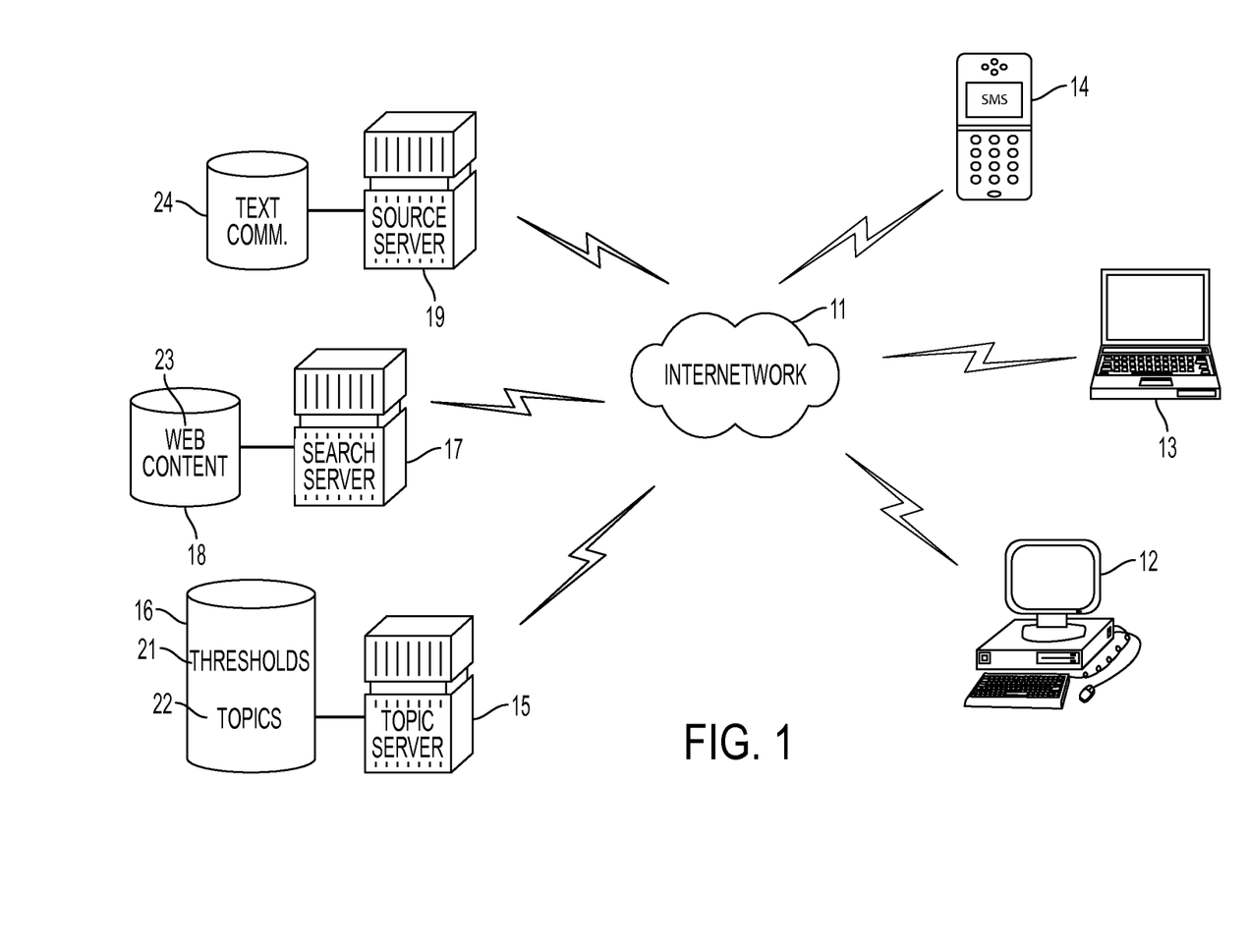
FIG. 1 is a block diagram showing a system for identifying topics for short text communications, in accordance with one embodiment.

Topics for one or more short text communications can be identified using related documents identified through a search query. FIG. 1 is a block diagram showing a system for identifying topics for short text communications, in accordance with one embodiment. A user device 12-14 is connected to one or more servers 15, 17, 19 via an internetwork 11, such as the Internet. The user device 12-14 can include a computer 12, laptop 13, or mobile device 14, such as a telephone 14 or personal digital assistant (not shown). In general, each user device 12-14 is a Web-enabled device that executes a Web browser or similar application, which supports interfacing to and information exchange and retrieval with the servers 15, 17, 19. Both the user devices 12-14 and servers 15, 17, 19 include components conventionally found in general purpose programmable computing devices, such as a central processing unit, memory, input/output ports, network interfaces, and non-volatile storage, although other components are possible. Moreover, other information sources in lieu of or in addition to the servers, and other information consumers, in lieu of or in addition to user devices, are possible.

The short text communications can include electronic updates, posts, messages, or documents, which can be obtained from a source server 19 via the user devices 12-14. Other types of short text communications are possible. The source server 19 is coupled to a database 20 that stores the short text communications 24. Documents related to the short text communications can be identified via a search server 17, which is coupled to a database 18 that stores Web content 23, including the related documents. The related documents can be analyzed by applying thresholds 21 stored in a database 16 coupled to a topic server 15. The database 16 also stores topics 22 identified for the short text communications 24, which can be accessed by the user devices 12-14 as filters for organizing and identifying particular short text communications.

The user devices 12-14 can include one or more modules for carrying out the embodiments disclosed herein. Additionally, the topic server 15 can include one or more modules for carrying out the embodiments. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
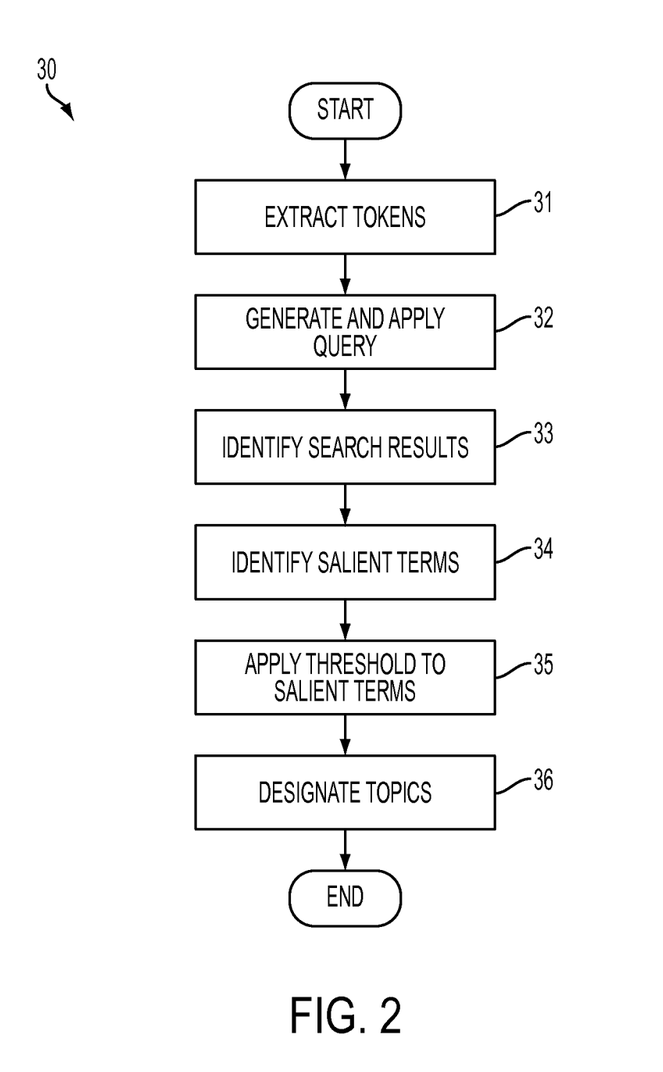
FIG. 2 is a flow diagram respectively showing a method for identifying topics for short text communications, in accordance with one embodiment.

Each short text communication can be analyzed for identifying topics. FIG. 2 is a flow diagram respectively showing a method 30 for identifying topics for short text communications, in accordance with one embodiment. Tokens, such as nouns, noun phrases, and root stems can be identified and extracted from the content of a short text communication (block 31). Other tokens are possible. The extracted tokens can then be used to form a search query for applying to a set of documents (block 32). The set of documents can include Web-based document, or remotely or locally stored electronic documents. Extracting tokens is further discussed below with reference to FIG. 3. The search query can be executed through known search engines, such as Yahoo or Google, as well as through internal search engines. The documents that match one or more tokens of the search query are identified as search results (block 33). The search results can be determined using a result threshold or rank. Other measures for determining the search results are possible. Identifying search results using a threshold is further discussed below with reference to FIG. 3. Once obtained, salient terms are identified for each search result (block 34). The salient terms can be determined automatically by the search engine or computed using tf-idf. Other term identification processes are possible. Identifying salient terms is further discussed below with reference to FIG. 3. A topic threshold is applied (block 35) to the salient terms for all the search results to identify one or more topics (block 36) for the short text communication. Identifying topics is further discussed below with reference to FIG. 3.

Figure 3:
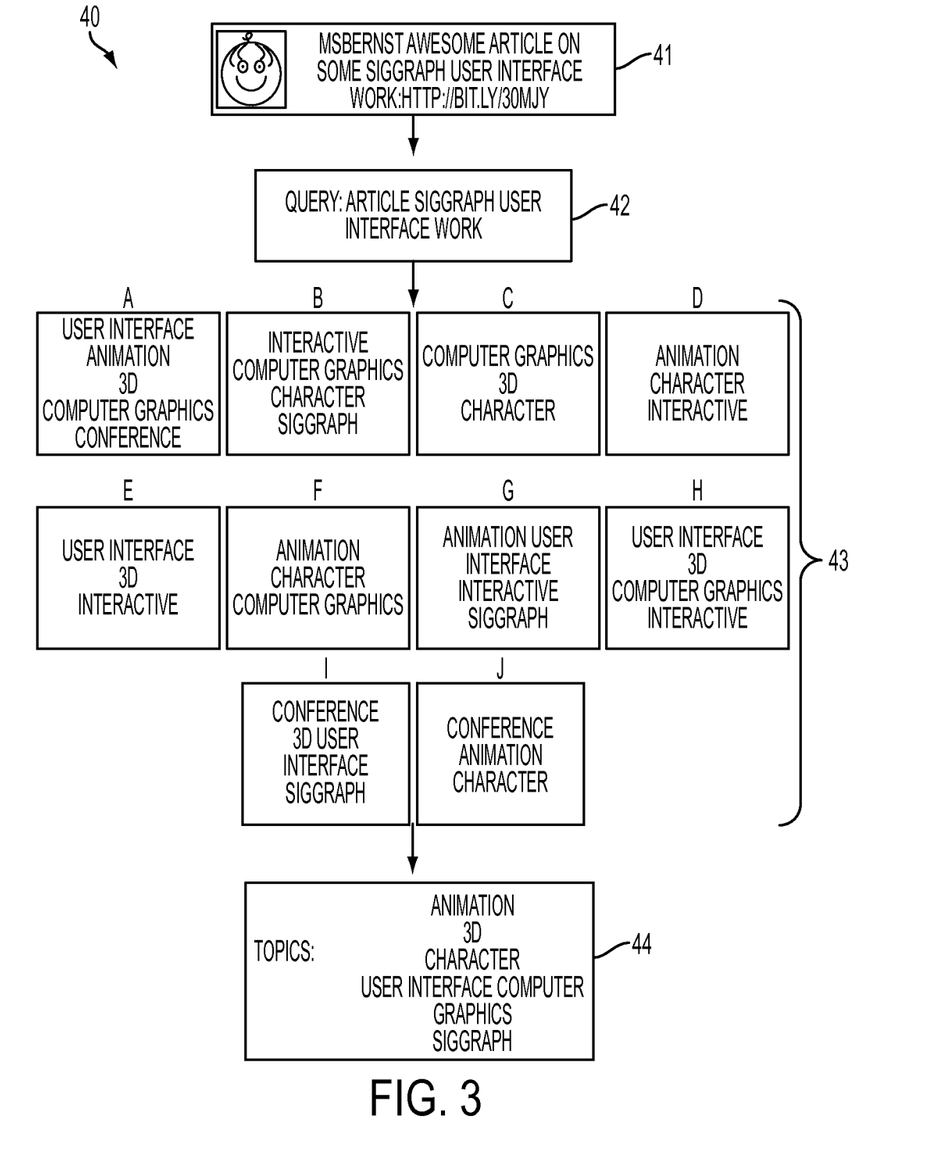
FIG. 3 is a block diagram showing, by way of example, an analysis flow for identifying topics according to the method of FIG. 2.

The identified topics can include tokens originally identified in the short text communication or salient terms identified in the related documents, but not the short text communication. FIG. 3 is a block diagram showing, by way of example, an analysis flow for identifying topics according to the method of FIG. 2. One or more short text communications 41 are obtained. Tokens, including nouns and noun phrases, are identified in the short text communication using a part-of-speech tagger. For example, the short text communication includes the message "awesome article on some SIGGRAPH user interface work: http://bit.ly/3OMJY." The tokens "article," "SIGGRAPH," "user interface," and "work" are identified by the tagger. Other methods for identifying the tokens are possible. Additionally, grammar specifically related to a source of the short text communication is analyzed. For instance, on Twitter, abbreviations, such as "RT" for re-tweet can be removed, while "@name" can be converted into a capitalized proper noun. Other examples are possible.

Once identified, one or more of the tokens can be used to generate a search query 42. In one embodiment, all the identified tokens can be used for the query, while, in a further embodiment, a subset of the tokens can be selected by a search engine for generating the query. Other processes for identifying the subset of search tokens are possible. The search query 42 is generated by concatenating the tokens, which are sent to the search engine.

Prior to conducting a search, the search engine can perform query transformation, rewording, or dropping of terms from the search query to provide results that are more closely related to the short text communication. To initiate the search, the search engine applies the search query to a set of documents. One or more of the documents that match at least one of the tokens are identified as search results. Alternatively, each of the search results must match all of the tokens in the query. The number of documents returned as search results can be based on a result threshold, which is determined automatically or designated by a user. The result threshold can include an absolute number, percentage, rank, score, or relevancy, as well as a combination of the thresholds. Other measures for determining the search results are possible. Returning to the previous example, a result threshold of ten documents is applied with the search query to identify the search results 43. Thus, at a maximum, ten search results 43 can be returned. The search results 43 selected can include those documents that are the most relevant to the short text communication, which can be indicated by a high rank, score, or percentage of similarity with the tokens.

The search results can each be returned with a list of predetermined salient terms or alternatively, the salient terms can be subsequently identified using tf-idf. One or more salient terms are identified for each search result. If tf-idf is applied, the terms appearing in the search result document with the highest tf-idf values can be selected as the salient terms. A topic threshold is applied to the salient terms to identify the topics. In one embodiment, the topic threshold includes a majority voting scheme in which each salient term is assigned votes and those salient terms that satisfy the threshold are designated as topics.

Returning to the previous example, the topic threshold for identifying salient terms as topics is five or more votes. The ten search results 43 are obtained along with the associated salient terms ("ST") as described below in TABLE 1.

TABLE 1

| Document | ST 1 | ST 2 | ST 3 | ST 4 | ST 5 |
|---|---|---|---|---|---|
| A | User Interface | Animation | 3D | Computer Graphics | Conference |
| B | Interactive | Computer Graphics | Character | SIGGRAPH | |
| C | Computer Graphics | 3D | Character | | |
| D | Animation | Character | SIGGRAPH | Interactive | |
| E | User Interface | 3D | Interactive | | |
| F | Animation | Character | Computer Graphics | | |
| G | Animation | User Interface | Interactive | SIGGRAPH | |
| H | User Interface | 3D | Computer Graphics | Interactive | |
| I | Conference | SIGGRAPH | User Interface | 3D | |
| J | Conference | Animation | Character | | |

Each of the salient terms is assigned a voting score based on the number of search results in which the salient term is located. More specifically, a salient term is assigned one vote for each document that includes the term. For example, the salient term "computer graphics" appears in search results A, B, C, F, and H. Accordingly, a voting score of five is assigned to the term "computer graphics." Since the five votes satisfies the topic threshold, the salient term "computer graphics" is identified as a topic for the short text communication. The salient terms that do not satisfy the threshold can be stored as suggestions for topics for the short text communication. Alternatively, the salient terms not satisfying the threshold can be discarded.

In a further embodiment, different topic thresholds can be applied to salient terms that appear in the short text communication and salient terms that are absent from the text communication. A salient term identified in the short text communication can be verbatim to a token or can be a root stem of a token in the short text communication. Other variations of the identified salient terms are possible. More specifically, the topic threshold can be lower or more relaxed for the salient terms identified in the short text communication. Other topic threshold measures are possible.

Returning to the previous example, the topic threshold for salient terms not identified in the short text communication is five or more votes, while the topic threshold for salient terms in the short text communication is three or more votes. The salient term "SIGGRAPH" is located in the short text communication and thus, the lower topic threshold of three votes is applied. "SIGGRAPH" is identified in four search results, including documents B, D, G, and I. A voting score of four is assigned to the salient term "SIGGRAPH," which satisfies the relaxed threshold of three documents. Accordingly, "SIGGRAPH" is designated as a topic for the short text communication.

At times, the search query may not return any related documents as search results. When no search results are returned, the search query can be modified. First, tokens in the query that have the fewest occurrences across a document set, such as a general Web document set, are removed until one or more results are obtained. Next, the full query is again obtained and terms with the most occurrences across the general Web document set are removed until one or more results are obtained. Other types of document sets are possible. Finally, the salient terms are identified for both sets of search results and a voting score is assigned to each salient term for identifying topics.

Once the topics have been identified, the short text communication can be displayed by topic. Often, multiple topics are identified for each short text communication. During presentation, the short text communication can be associated with and represented by a subset of the topics, which can be selected from the topics using a greedy algorithm. For example, the topic associated with the largest grouping of short text communications is assigned for presentation. Next, the topic with the next largest grouping of short text communications is assigned and so on. A presentation threshold can be applied to the assignment of topics for presentation such that only a portion of the topics are associated with the presentation of the short text communication. The threshold can be an absolute number of topics or a percentage of all the topics. Finally, the topics that do not satisfy the threshold are discarded. Other methods and thresholds for identifying presentation topics are possible.

Figure 4:
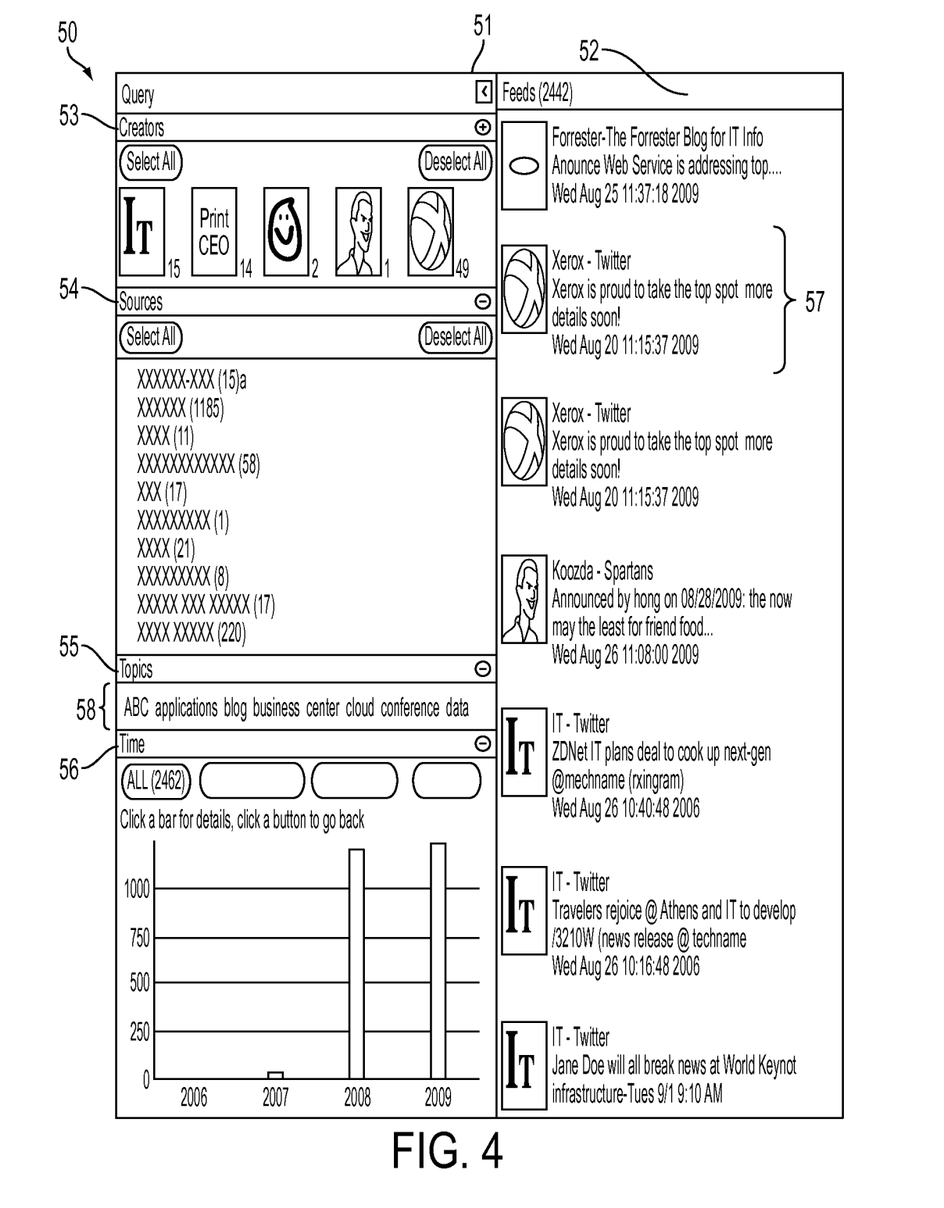
FIG. 4 is a screenshot showing, by way of example, a user interface with user selectable filters for short text communications.

The subset of topics can be used to locate and display the short text communication and other short text communications having content associated with the same topics. FIG. 4 is a screenshot 50 showing, by way of example, a user interface 51 with user selectable filters for short text communications. The user interface 51 can be implemented in a Web-based form, such as in a Web browser, or any other type of software interface. The user interface 51 can include an information stream feed list 52, which displays one or more short text communications 57 to or by a user. The short text communications 57 can be displayed in chronological order beginning with the most recently received communication or alternatively, beginning with the first received short text communication. One or more user-interactive filters 53-56 are also provided on the user interface 51 to filter the feed list 52. The filters 53-56 can include creator 53, source 54, time 56, and topic 55 filters that are used to organize and filter the feed list 52 based on information extracted from the content of short text communications. Other filters are possible.

Each of the filters 53-56 is represented by one or more user selectable elements, such as icons representing a characteristic of the filter, text, or numbers, which are associated with the number of feeds related to each user selectable element. The elements are individually selectable. User selection of one of the elements associated with a filter can identify and display all the short text communications in the news feed 52 that match the selected element for that filter. The filters can be used individually or in combination with other filters to refine searches for particular short text communications.

The topic filter 55 provides an overview of the content of the short text communications displayed in the feed list 52.

Thus, when all the short text communications are displayed, the number of topics can be large and the content covered can be varied. As the short text communications are filtered for display in the feed list 52, the number of topics and content can become narrowed and more focused. The topics can be displayed by text elements in a tag cloud 58. Other types of topic displays, such as a list or table are possible. Each of the topics in the topic filter 55 is represented by a user selectable element that includes the name of the topic. Selecting a topic element filters the short text communications to display only those communications that are associated with the selected topic in the feed list 52 by removing the short text communications that are not associated with the selected topic. Identifying and assigning topics to short text communications is described above with reference to FIGS. 2 and 3.

Once filtered, the tag cloud 58 can be updated to display the topics associated with the short text communications displayed in the feed list 52. Additional selections of the topics further filter the short text communications displayed in the feed list 52. The selection of more than one topic can function either as an OR query, displaying feed items containing any of the selected topics, or an AND query, requiring all selected topics to be in the feed item. The other filters 53, 54, 56 are updated accordingly.

Topic identification allows a user to easily and efficiently locate short text communications that are of interest, as described above. Further examples involving use of the topics include displaying updates for particular topics, tracking topics over time, finding short text communications that are of interest to the user but are generally unpopular, and conducting a review of new short text communications received.

Meanwhile, the short text communications can also be filtered using the creator 53, source 54, and time 56 filters. The creator filter 53 can include an individual, corporate entity, or other creator. A number can be located adjacent to the icon to indicate the number of feed items that specific creator has contributed to the feed list 52. The selection of one of the icons dynamically updates the feed list 52 to display only those short text communications that were received from the associated creator.

The source filter 54 includes a list of source elements from which the displayed short text communications originated. Each source element represents a single source by name. Examples of sources include Facebook and Twitter, as well as other social networking and news sources. The selection of a source element 54 displays only those short text communications that originated with the selected source. The time filter 56 aggregates and displays information associated with a time period during which the short text communication was created. The selection of a time period allows a user to view the short text communications based on time measurements, such as a year, month, or day level, which can be displayed as a bar graph, chronological list, or in another format. In a further embodiment, the time filter can be based on a time period during which the short text communications were received. The presentation and filtering of short text communications by topic are further described with reference to commonly-assigned U.S. patent application Ser. No. 12/646, 846, filed Dec. 23, 2009, titled "System and Method for Triaging of Information Feeds, pending."

Although identifying topics has been discussed with respect to short text communications from social networking Websites and services, other short text snippets are possible, such as abstracts, emails, and text messages.

While the invention has been particularly shown and described as referenced to the embodiments thereof, those skilled in the art will understand that the foregoing and other changes in form and detail may be made therein without departing from the spirit and scope of the invention.

What is claimed is:

1. A system for identifying topics for short text communications, comprising:
 a receipt module to receive one or more social status updates from one or more social networking sources;
 an extraction module to extract tokens from text of one or more of the social status updates;
 a topic generator to generate topics for at least one of the social status updates based on a set of documents separate from the social status updates from which the tokens are extracted, comprising:
  a query module to generate a single query using all of the tokens extracted from the social status update and to apply the query to the separate set of documents;
  a result identification module to identify those documents in the separate set that match one or more tokens in the query as search results;
  a threshold module to identify salient terms within each of the search results;
  an identification module to identify one or more of the salient terms within the search results that occur in one or more of the social status updates as update salient terms and to identify one or more of the salient terms within the search results that are absent from the social status updates as result salient terms;
  an update topic module to determine the topics for the social status update based on the update salient terms, comprising:
   an update score module to assign each of the update salient terms within the search results a voting score based on a number of different search results in which the update salient term is located;
   a topic threshold module to apply a topic threshold to the score for each update salient term and to designate those of the update salient terms whose scores satisfy the topic threshold as the topics; and
   an update storage module to store the update salient terms whose scores do not satisfy the topic threshold as topic suggestions;
  a result topic module to determine the topics for the social status update based on the result salient terms, comprising:
   a result score module to assign each of the result salient terms within the search results a voting score based on a number of different search results in which the result salient term is located;
   a different threshold module to apply a different threshold to the score for each of the result salient terms and to designate those result salient terms whose scores satisfy the different threshold as the topics; and
   a result storage module to store the result salient terms whose scores do not satisfy the different threshold as the topic suggestions;
 a filter module to filter the social status updates based on at least one of the topics of the social status updates, times associated with the social status updates, the sources of the social status updates, and creators of the social status updates;
 an update display module to display the filtered social status updates;
 a tag cloud module to display in a tag cloud the topics of the displayed filtered social status updates; and
 a processor to execute the modules.

2. A system according to claim 1, further comprising:
a part-of-speech tagger to identify the tokens in the at least one social status update.

3. A system according to claim 1, further comprising:
a concatenation module to concatenate the extracted tokens to form the query.

4. A system according to claim 1, wherein the topics comprise at least one of a token identified in the at least one social status update and a token absent from the at least one social status update.

5. A system according to claim 1, wherein the salient terms are identified at least one of automatically or by frequency criteria.

6. A system according to claim 1, wherein the separate set of documents comprise Web-based documents.

7. A system according to claim 1, further comprising:
a display to present the topics with other.

8. A system according to claim 1,
wherein the topic threshold is lower than the different threshold.

9. A method for identifying topics for short text communications, comprising the steps of:
receiving one or more social status updates from one or more social networking sources;
extracting tokens from text of one or more of the social status updates;
generating topics for at least one of the social status updates based on a set of documents separate from the social status updates from which the tokens are extracted, comprising:
generating a single query using all of the tokens extracted from the social status update and applying the query to the separate set of documents;
identifying those documents in the set that match one or more tokens in the query as search results;
identifying salient terms within each of the search results;
identifying one or more of the salient terms within the search results that occur in one or more of the social status updates as update salient terms;
identifying one or more of the salient terms within the search results that are absent from the social status updates as result salient terms; and
determining the topics for the social status update based on the update salient terms, comprising:
assigning each of the update salient terms within the search results a voting score based on a number of different search results in which the update salient term is located;
applying a topic threshold to the score for each of the update salient terms and designating those of the update salient terms whose scores satisfy the topic threshold as the topics; and
storing the update salient terms whose scores do not satisfy the topic threshold as topic suggestions;
determining the topics for the social status update based on the result salient terms, comprising:
assigning each of the result salient terms within the search results a voting score based on a number of different search results in which the result salient term is located;
applying a different threshold to the score of each of the result salient terms and designating those of the result salient terms whose scores satisfy the different threshold as the topics; and
storing the result salient terms whose scores do not satisfy the different threshold as the topic suggestions;
filtering the social status updates based on at least one of the topics of the social status updates, times associated with the social status updates, the sources of the social status updates, and creators of the social status updates;
displaying the filtered social status updates; and
displaying in a tag cloud the topics of the displayed filtered social status updates,
wherein the steps are performed by a suitably-programmed computer.

10. A method according to claim 9, further comprising:
applying a part-of-speech tagger to the at least one social status update to identify the tokens.

11. A method according to claim 9, further comprising:
concatenating the extracted tokens to form the query.

12. A method according to claim 9, wherein the topics comprise at least one of a token identified in the at least one social status update and a token absent from the at least one social status update.

13. A method according to claim 9, wherein the salient terms are identified at least one of automatically or by frequency criteria.

14. A method according to claim 9, wherein the separate set of documents comprise Web-based documents.

15. A method according to claim 9, further comprising:
presenting the topics in a display with other topics.

16. A method according to claim 9,
wherein the topic threshold is lower than the different threshold.

* * * * *